(12) United States Patent
Kishore et al.

(10) Patent No.: US 11,368,323 B2
(45) Date of Patent: Jun. 21, 2022

(54) SYSTEM AND A METHOD FOR FACILITATING MEETING CONTENT FOR ATTENDING A MEETING

(71) Applicant: Zensar Technologies Limited, Maharashtra (IN)

(72) Inventors: Sandeep Kishore, Fremont, CA (US); Sumant Kulkarni, Pune (IN); Shikhar Agrawal, Pune (IN); Hari Eswar S M, Pune (IN); Aishwarya Chaurasia, Pune (IN); Richa Sawhney, Pune (IN); Shree Krishna Somani, Pune (IN)

(73) Assignee: Zensar Technologies Limited, Maharashtra (IN)

( * ) Notice: Subject to any disclaimer, the term of this patent is extended or adjusted under 35 U.S.C. 154(b) by 33 days.

(21) Appl. No.: 17/124,043

(22) Filed: Dec. 16, 2020

(65) Prior Publication Data

US 2021/0184879 A1 Jun. 17, 2021

(30) Foreign Application Priority Data

Dec. 16, 2019 (IN) .............................. 201921052195

(51) Int. Cl.
*H04L 12/18* (2006.01)
*G06Q 10/10* (2012.01)
*G06Q 10/06* (2012.01)

(52) U.S. Cl.
CPC ..... *H04L 12/1831* (2013.01); *G06Q 10/0639* (2013.01); *G06Q 10/1095* (2013.01); *H04L 12/1822* (2013.01)

(58) Field of Classification Search
CPC ............ H04L 12/1831; H04L 12/1822; G06Q 10/0639; G06Q 10/1095
See application file for complete search history.

(56) References Cited

U.S. PATENT DOCUMENTS 9,953,650 B1 * 4/2018 Falevsky ................. G06F 3/013
2004/0174392 A1 * 9/2004 Bjoernsen .............. G06Q 10/10
715/751

(Continued)

FOREIGN PATENT DOCUMENTS

WO WO-2017223302 A1 * 12/2017 ........... G06F 16/242

*Primary Examiner* — Patrice L Winder
*Assistant Examiner* — Angela M Widhalm De Rodrig
(74) *Attorney, Agent, or Firm* — Hamre, Schumann, Mueller & Larson, P.C.

(57) ABSTRACT

A system and a method for facilitating meeting content to be referred for attending a meeting. The system receives a current meeting information associated with the meeting. The system computes similarity scores corresponding to a plurality of past meeting information against the current meeting information. The system identifies a past meeting information with highest similarity score and a set of past service provider entities from the past meeting information. The system identifies a past skillset based on a set of past service provider parameters associated with the set of past service provider entities and correlates the past skillset with a current skillset associated with at least one current service provider entity to identify a skill gap, between the past and current skillsets. The system extracts and facilitates meeting content to the at least one current service provider entity for attending the meeting based on the identified skill gap.

15 Claims, 4 Drawing Sheets

(56) References Cited

U.S. PATENT DOCUMENTS

| | | | |
|---|---|---|---|
| 2008/0303811 A1* | 12/2008 | Van Luchene | A63F 13/85 345/419 |
| 2009/0172161 A1* | 7/2009 | Singh | G06F 16/958 709/225 |
| 2014/0136259 A1* | 5/2014 | Kinsey, II | G06Q 10/063116 705/7.16 |
| 2014/0358613 A1 | 12/2014 | Libin | |
| 2015/0046367 A1 | 2/2015 | Libin et al. | |
| 2015/0058425 A1 | 2/2015 | Nathan et al. | |
| 2017/0316385 A1* | 11/2017 | Joshi | G06F 16/9535 |
| 2018/0007100 A1* | 1/2018 | Krasadakis | G06Q 10/1095 |
| 2019/0287041 A1* | 9/2019 | Togwe | H04L 51/046 |
| 2019/0340579 A1* | 11/2019 | Krystek | G06N 3/088 |
| 2020/0210965 A1* | 7/2020 | Garber | G06Q 10/06315 |
| 2020/0234380 A1* | 7/2020 | Dulori | G06Q 40/08 |
| 2021/0058264 A1* | 2/2021 | Fahrendorff | G10L 15/22 |

\* cited by examiner

SYSTEM AND A METHOD FOR FACILITATING MEETING CONTENT FOR ATTENDING A MEETING

TECHNICAL FIELD

The present invention relates to data analysis, and more particularly to analysing data for facilitating meeting content to be referred by a service provider for attending a meeting.

BACKGROUND OF THE INVENTION

In this competitive world, it becomes utmost important to make best use of the available resources and time to successfully attend a meeting. While the meeting is attended between entities representing either service provider, client, stakeholders, it becomes important to understand the current capabilities of the available entities attending the meeting. Understanding the current capabilities helps in timely analyzing the current skills of the entities and timely enhancing their skills/knowledge as per the meeting requirement. However, in the organizations like MNCs or corporates a number of day-to-day business activities are performed. These activities may include, for example, individuals attending a meeting, outcome of the meetings, individual acquiring new skills, individuals leaving the organization, new individuals joining the organization and the like. All these activities generate a huge amount of data in a structured and non-structured format, and therefore it becomes a challenge to analyze such huge data to generate a meaningful information.

When any meeting is scheduled between two parties (e.g., service provider-client, one stakeholder with another stakeholder, or even within the organization), we generally have information of the individuals (entities) attending the meeting. However, whether the individuals are skilled enough or have proper knowledge for successfully attending the scheduled meeting is point of concern. The technical challenge here is analyzing the huge data (as discussed in above paragraph) to not only understand the requirement of the meeting, but at the same time, also analyzing the current capabilities/skills of the entities available for the meeting. The further challenge is how to identify relevant content, stored in different databases, which can help in enhancing skills of the entities beforehand i.e., before attending the meeting.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE INVENTION

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one embodiment of the present disclosure, a method of facilitating meeting content to be referred by a service provider for attending a meeting is disclosed. The method comprises receiving a current meeting information associated with the meeting to be attended between a client and the service provider. The current meeting information comprises a set of current service provider entities available for attending the meeting. The method further comprises computing a plurality of similarity scores corresponding to a plurality of past meeting information against the current meeting information. The plurality of past meeting information are associated with a plurality of past meetings attended by the service provider. Further, the method comprises identifying a past meeting information, amongst the plurality of past meeting information associated with a plurality of past meetings attended by the service provider, having a highest similarity score, amongst the plurality of similarity scores. The method further comprises identifying a set of past service provider entities from the past meeting information. The set of past service provider entities were involved in attending the past meetings similar to the meeting to be attended. The method further comprises identifying a past skillset based on a set of past service provider parameters associated with the set of past service provider entities. The past skillset is associated with at least one past service provider entity of the set of past service provider entities. The method further comprises correlating the past skillset with a current skillset associated with at least one current service provider entity of the set of current service provider entities to identify a skill gap, between the past skillset and the current skillset, to be attained by the current service provider entity. Further, the method comprises extracting the meeting content from one or more databases, based on the identified skill gap. The meeting content is facilitated to the at least one current service provider entity for attending the meeting.

In one embodiment of the present disclosure, a system for facilitating meeting content to be referred by a service provider for attending a meeting is disclosed. The system comprises a receiving unit configured to receive a current meeting information associated with the meeting to be attended between a client and the service provider. The current meeting information comprises a set of current service provider entities available for attending the meeting. The system further comprises a computing unit configured to compute a plurality of similarity scores corresponding to a plurality of past meeting information against the current meeting information. The plurality of past meeting information are associated with a plurality of past meetings attended by the service provider. The system also comprises an identification unit configured to identify a past meeting information, amongst the plurality of past meeting information associated with a plurality of past meetings attended by the service provider, having a highest similarity score, amongst the plurality of similarity scores. The identification unit is further configured to identify a set of past service provider entities from the past meeting information. The set of past service provider entities were involved in attending the past meetings similar to the meeting to be attended. The identification unit is further configured to identify a past skillset based on a set of past service provider parameters associated with the set of past service provider entities. The past skillset is associated with at least one past service provider entity of the set of past service provider entities. The system further comprises a correlating unit configured to correlate the past skillset with a current skillset associated with at least one current service provider entity of the set of current service provider entities to identify a skill gap, between the past skillset and the current skillset, to be attained by the current service provider entity. Further, the system comprises an extraction unit configured to extract the meeting content from one or more databases based on the identified skill gap. The meeting content is facilitated to the at least one current service provider entity for attending the meeting.

In one embodiment of the present disclosure, a non-transitory computer-readable storage medium is disclosed. The medium stored instructions that when processed by a processor cause a system to perform operations. The operation comprises receiving a current meeting information associated with the meeting to be attended between a client and the service provider. The current meeting information comprises a set of current service provider entities available for attending the meeting. The operation further comprises computing a plurality of similarity scores corresponding to a plurality of past meeting information against the current meeting information. The plurality of past meeting information are associated with a plurality of past meetings attended by the service provider. Further, the operation comprises identifying a past meeting information, amongst the plurality of past meeting information associated with a plurality of past meetings attended by the service provider, having a highest similarity score, amongst the plurality of similarity scores. The operation further comprises identifying a set of past service provider entities from the past meeting information. The set of past service provider entities were involved in attending the past meetings similar to the meeting to be attended. The operation further comprises identifying a past skillset based on a set of past service provider parameters associated with the set of past service provider entities. The past skillset is associated with at least one past service provider entity of the set of past service provider entities. The operation further comprises correlating the past skillset with a current skillset associated with at least one current service provider entity of the set of current service provider entities to identify a skill gap, between the past skillset and the current skillset, to be attained by the current service provider entity. Further, the operation comprises extracting the meeting content from one or more databases, based on the identified skill gap. The meeting content is facilitated to the at least one current service provider entity for attending the meeting.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The embodiments of the disclosure itself, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings in which.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE INVENTION

The foregoing has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure.

The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Disclosed herein is a system and method for facilitating meeting content to be referred by a service provider for attending a meeting between a client and the service provider. It may be understood to a person skilled in art that meeting may be scheduled between any two parties and not necessarily between the client and the service provider only. According to embodiments of the present disclosure, the meeting may be scheduled between the two parties who may be from same organization or from different stakeholders of the organization. Therefore, the scope of the present disclosure shall not be limited for the meeting to be attended between the client and the service provider only. In the highly competitive world of today, it is very important for business organizations/service providers to make the best possible use of the available resources in order to score maximum business opportunities and in turn maximize their profits. Business organizations/service providers often engage in meetings with clients to either pitch their product, or offer solutions to clients based on their needs, etc. However, it may so happen that the entities (or people or connects or person) from the business organization/the service provider that are available for the meeting do not have relevant skills required to successfully execute the meeting. This could therefore incur huge losses to the business organization/the service provider and would also hamper the professional growth of the entities engaged in the meeting.

The present disclosure understands this need and provides a technique for identifying a skill gap of the entities going for the meeting. For instance, an entity who is going to attend a meeting have certain skills, for e.g., C, C++, Java, however analysis shows an entity who previously attended similar successful meeting had skills for e.g., C, C++, and mainframe. It is, therefore, very crucial to identify said skill gap i.e., "knowledge of mainframe" which is lacking for the entity going to attend the meeting. Once the skill gap is identified, in next step, the present disclosure extracts the relevant meeting content which can help the entities available for the meeting to enhance his/her skill and successfully execute the meeting.

Figure 1:
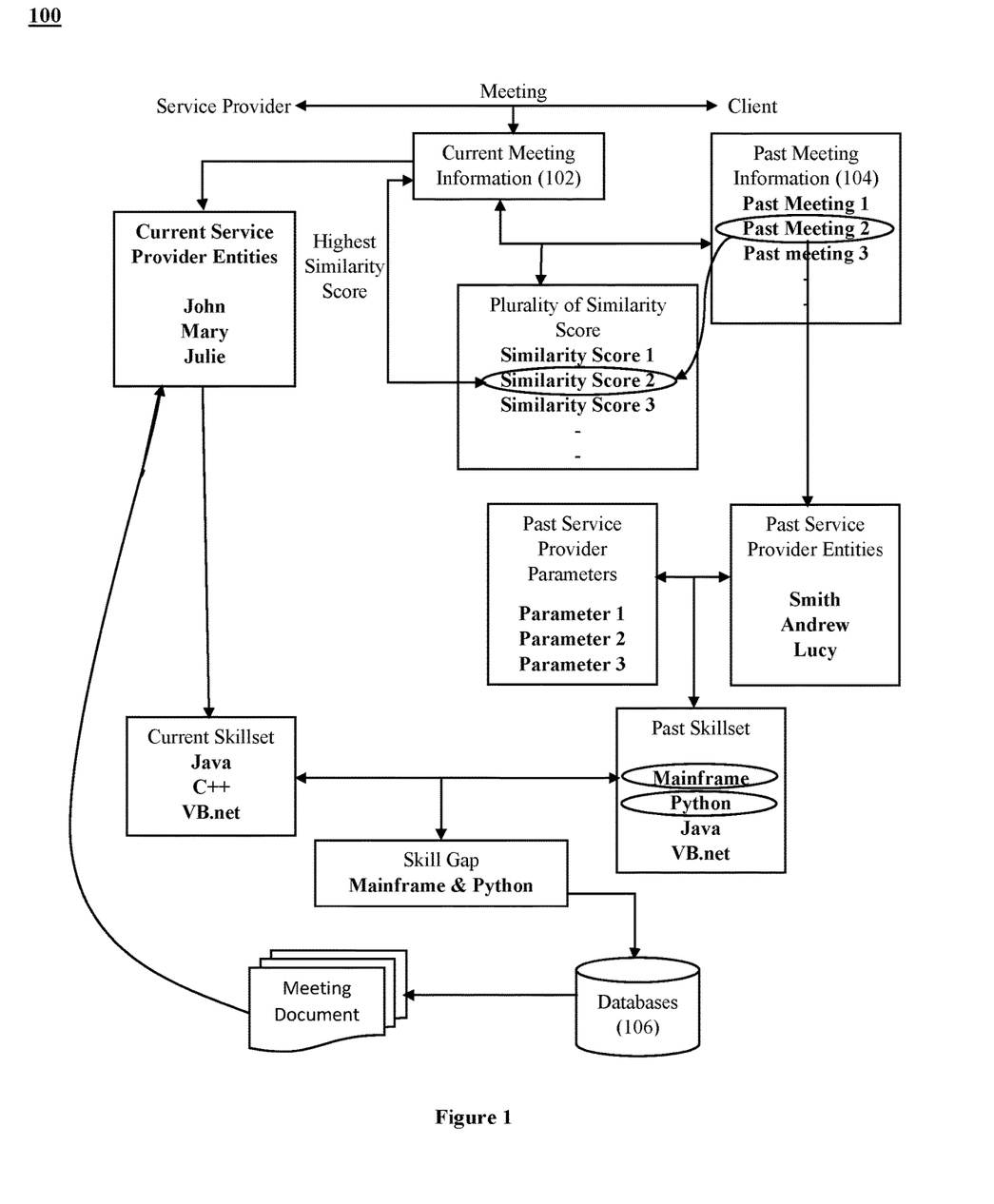
FIG. 1 shows an exemplary environment 100 of a system for facilitating meeting content to be referred by a service provider for attending a meeting, in accordance with an embodiment of the present disclosure.

FIG. 1 shows an exemplary environment 100 of a system for facilitating meeting content to be referred by a service provider for attending a meeting, in accordance with an embodiment of the present disclosure. It must be understood to a person skilled in art that the system may also be implemented in various environments, other than as shown in FIG. 1.

Figure 2:
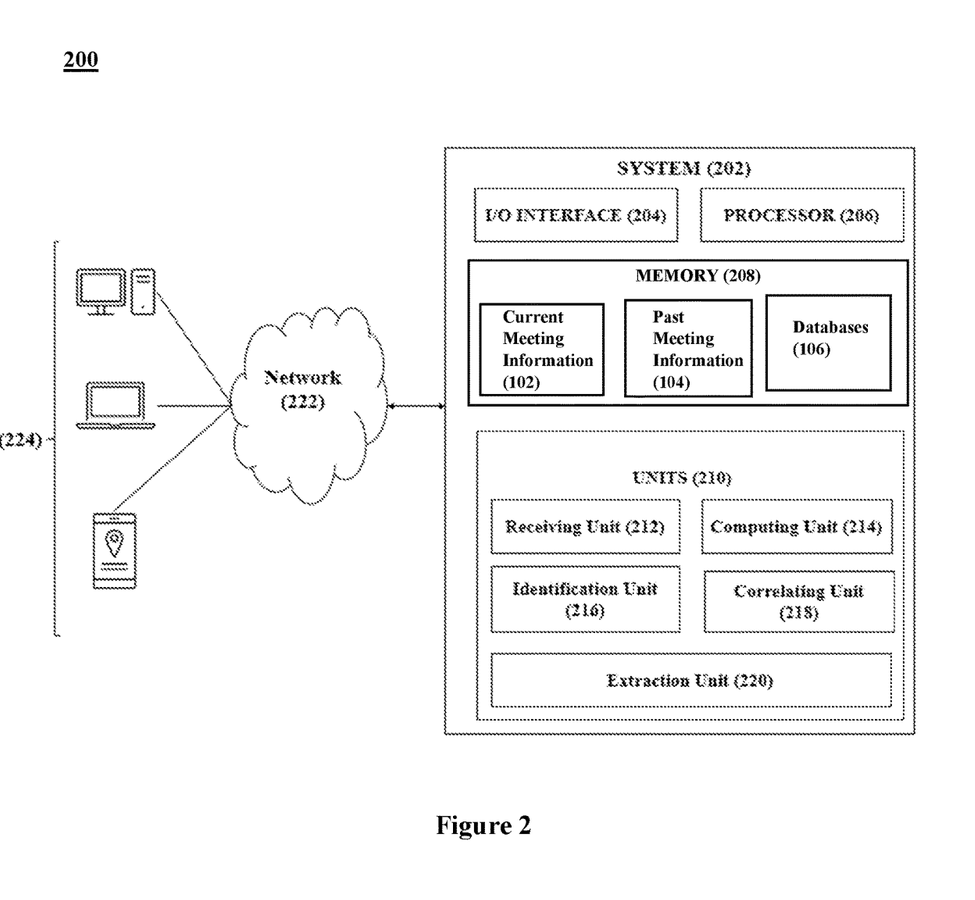
FIG. 2 shows a block diagram 200 illustrating a system for facilitating meeting content to be referred by a service provider for attending a meeting, in accordance with an embodiment of the present disclosure.

The detailed explanation of the exemplary environment 100 is explained in conjunction with FIG. 2 that shows a block diagram 200 of a system for facilitating the meeting content to be referred by the service provider for attending a meeting, in accordance with an embodiment of the present disclosure. Although the present disclosure is explained considering that the system 202 is implemented on a server, it may be understood that the system 202 may be implemented in a variety of computing systems, such as a laptop computer, a desktop computer, a notebook, a workstation, a mainframe computer, a server, a network server, a cloud-based computing environment. It may be understood that the system 202 may be accessed by multiple users through one or more user devices 224 or applications residing on the user devices. In one implementation, the system 202 may comprise the cloud-based computing environment in which a user may operate individual computing systems configured to execute remotely located applications. Examples of the user devices 224 may include, but are not limited to, a IoT device, IoT gateway, portable computer, a personal digital assistant, a handheld device, and a workstation. The user devices 224 are communicatively coupled to the system 202 through a network 222.

In one implementation, the network 222 may be a wireless network, a wired network or a combination thereof. The network 222 can be implemented as one of the different types of networks, such as intranet, local area network (LAN), wide area network (WAN), the internet, and the like. The network 222 may either be a dedicated network or a shared network. The shared network represents an association of the different types of networks that use a variety of protocols, for example, Hypertext Transfer Protocol (HTTP), Hypertext Transfer Protocol Secure (HTTPS), Transmission Control Protocol/Internet Protocol (TCP/IP), Wireless Application Protocol (WAP), and the like, to communicate with one another. Further the network 222 may include a variety of network devices, including routers, bridges, servers, computing devices, storage devices, and the like.

In one implementation, the system 202 may comprise an I/O interface 204, a processor 206, a memory 208 and the units 210. The memory 208 may be communicatively coupled to the processor 206 and the units 210. Further, the memory 208 may store current meeting information 102, past meeting information 104, and databases 106. According to an embodiment, the databases 106 may be external to the system 202. The significance and use of each of the stored quantities is explained in the upcoming paragraphs of the specification. The processor 206 may be implemented as one or more microprocessors, microcomputers, microcontrollers, digital signal processors, central processing units, state machines, logic circuitries, and/or any devices that manipulate signals based on operational instructions. Among other capabilities, the processor 206 is configured to fetch and execute computer-readable instructions stored in the memory 208. The I/O interface 204 may include a variety of software and hardware interfaces, for example, a web interface, a graphical user interface, and the like. The I/O interface 204 may allow the system 202 to interact with the user directly or through the user devices 224. Further, the I/O interface 204 may enable the system 202 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting many devices to one another or to another server.

In one implementation, the units 210 may comprise a receiving unit 212, a computing unit 214, an identification unit 216, a correlating unit 218, and an extraction unit 220. According to embodiments of present disclosure, these units 212-220 may comprise hardware components like processor, microprocessor, microcontrollers, application-specific integrated circuit for performing various operations of the system 202. It must be understood to a person skilled in art that the processor 206 may perform all the functions of the units 212-220 according to various embodiments of the present disclosure.

Once the meeting is scheduled between the client and the service provider, the receiving unit 212 may receive the current meeting information 102 pertaining to such meeting. According to embodiments of the disclosure, the receiving unit 212 may receive the current meeting information 102 from various sources associated with an organization or through a user device 224 connected to the system 202 when a new meeting is scheduled between the service provider and the client. According to embodiments of the present disclosure, the client and the service provider may be internal or external to the organisation. For instance, in case the meeting is scheduled between two internal departments of an organisation, one may be referred to as a client and other may be referred to a service provider, e.g., a meeting scheduled between a development team and a marketing team. In said example, since the marketing team will be providing their services relating to marketing a product developed by the development team, the marketing team may be referred as a service provider and the development team may be referred as a client. Further, in another case, a meeting may be scheduled between two subsidiaries of a company, one of the subsidiary companies may be referred as a client and other subsidiary company may be referred as a service provider. Moreover, in case, a meeting is scheduled between two different organizations, one of the organizations may be referred as a client and other organization may be referred to as the service provider.

In an embodiment, the system 202 may access an email/event database associated with the user device 224 to automatically determine an occurrence of a meeting. In some embodiments, the system 202 may then request for the current meeting information 102 from the user device 224. In some other embodiments, the user device 224 may be configured to automatically transmit the current meeting information 102, every time a meeting is scheduled. In some alternative embodiments, a user of the user device 224 may push the current meeting information 102 whenever the user may request for meeting content from the system 202. The current meeting information 102 comprises details such as, but not limited to, client name (e.g., Pi Inc.), client's business type (e.g., Electronic Equipments), client's requirement (e.g., software application for inventory management), meeting location (e.g., Delhi office) and meeting date and time (e.g., Dec. 10, 2020; 10:00 AM), and service provider entities (e.g., John, Mary, Julie) who will attending the meeting. In an embodiment, the current meeting information 102 may further include one or more service provider parameters associated with the service provider entities. The service provider parameters may include, but not limited to, entity name (e.g., John, Mary, Julie), entity access level (e.g., Limited access, Full access), entity designation (e.g., Team lead, Project Manager, Senior Developer) and entity current skillset (e.g., Java, C++ VB.net, Python). In alternative embodiments, the service provider parameters may be stored in separate database communicably coupled to at least one of the user devices 224 and the system 202.

The current meeting information 102 may be stored in the memory 208. The memory 208 may also include past meeting information 104 and the databases 106. The past meeting information 104 may be associated with a plurality of past meetings (e.g., past meeting 1, past meeting 2, past meeting 3) attended by the service provider. In an embodiment, the past meeting information 104 may be associated with a plurality of past meetings which were successfully converted into business opportunity. Further, the past meeting information 106 may include similar information as included in the current meeting information 102, therefore description of the same has been avoided for the sake of brevity.

Now in next step, the computing unit 214 may compute a plurality of similarity scores (e.g., similarity score 1, similarity score 2 and similarity score 3) corresponding to the past meeting information 104 against the current meeting information 102. In an embodiment, to compute the plurality of similarity scores, cosine similarity technique may be employed. For applying the cosine similarity technique, the computing unit 214 may first generate a plurality of past meeting vector representations (say $\vec{A}$, $\vec{B}$ and $\vec{C}$) corresponding to the plurality of past meeting information (say A, B and C) stored in the memory 208. Then, the computing unit 214 may generate a current meeting vector representation (say $\vec{M}$) corresponding to the current meeting information. The computing unit 214 then applies the cosine similarity technique on each of the past meeting information vector representations $\vec{A}$, $\vec{B}$ and $\vec{C}$ vis-à-vis the current meeting vector representation $\vec{M}$ to generate the plurality of similarity scores.

For instance, to determine the similarity score 1 between the past meeting vector representation $\vec{A}$ and current meeting vector representation $\vec{M}$, cosine similarity is applied as—

$$\text{Similarity}(A, M) = \frac{A \cdot M}{\|A\| \times \|M\|} = \frac{\sum_{i=1}^{n} A_i \times M_i}{\sqrt{\sum_{i=1}^{n} A_i^2} \times \sqrt{\sum_{i=1}^{n} M_i^2}}$$

Similar implementation of the cosine similarity technique may be applied to determine the similarity score 2 and similarity score 3 between the past meeting vector representation $\vec{B}$ and the current meeting vector representation $\vec{M}$ and between the past meeting vector representation $\vec{C}$ and the current meeting vector representation $\vec{M}$. The similarity scores generated by this technique may be in the form of decimals between 0 and 1, where '1' denotes the highest match and '0' denotes the lowest match. However, the similarity scores can be converted in other forms such as a percentage based on the type of application.

Now, in the exemplary environment 100 as shown in FIG. 1, the past meeting information 104 corresponding to the past meeting 2 having similarity score 2 is assumed to have highest similarity with the current meeting information 102. The identification unit 216 may then identifies a set of past service provider entities from the identified past meeting information 104 i.e., past meeting 2. The set of past service entities are individuals who were involved in attending the past meeting similar to the meeting to be attended. For instance, Smith, Andrew and Lucy are identified as "the set of past service provider entities", who attended the past meeting 2. Thereafter, the identification unit 216 may identify a past skillset based on a set of past service provider parameters associated with the set of past service provider entities. For instance, in the example illustrated in environment 100, the identified past skillset includes Mainframe, Python, Java, and VB.net. The identification unit 216 may identify past skill associated with each of the identified past service provider entities, however for illustration purposes the skillset associated with one of the past service provider entity (e.g., Andrew) has been considered. The past service provider parameters (e.g., parameter 1, parameter 2, parameter 3) may corresponds to respective past service provider entities (e.g., Smith, Andrew and Lucy, respectively). The memory 208 may store the past service provider parameters corresponding to each of the past service provider entities who attended past meeting on behalf of the service provider. In an embodiment, the service provider parameters may be accessed by the identification unit 216 while identifying the past service provider entities associated with the past meeting having highest similarity score. The past service provider parameters may include at least one of designation, band-level, skills, competency level, experience, business unit and win ratio. For instance, according to exemplary environment 100, for each of the identified past service provider entities namely, Smith, Adrew and Lucy, the past service provider parameters are considered as shown as an example in table 1.

TABLE 1

| | Service provider parameters | | |
|---|---|---|---|
| Parameters | Smith | Andrew | Lucy |
| Designation | Team Lead | Project Manager | Senior Developer |
| Band-level | Senior-level | Mid-level | Mid-level |
| Skills | Strong communication, networking and planning skills, Technical skills includes Java, Ruby, python. | Strong project management skills, Good Analytics skills, Technical skills including Mainframe, Python, Java, VB.Net | Strong Technical skills including Mainframe and Python. |
| Competency level | Intermediate | Expert | Beginner |
| Experience | 6 years | 4 years | 3 years |
| Business Unit | Senior Management | Management | Development |
| Win Ratio | 3:4 | 2:4 | 2:4 |

Once, the past skillset is identified, the correlating unit 218 may correlate the past skillset with a current skillset (e.g., Java, C++, VB.net) associated with at least one current service provider entity to identify a skill gap. The current skillset may refer to skillset associated with the current service provider entities who will attending the scheduled meeting. In the illustrated embodiment, the current skillset associated with one of the current service provider entities (say John) has been considered, however the system 202 may consider all current skillset of all the current service provider entities in a way as explained below.

In an embodiment, the correlating unit 218 may correlate the past skillset associated with each of the past service provider entities with the current skillset associated with each of the current service provider entities. For example, the correlating unit 218 may correlate the skillset of Smith with skillset associated with each of John, Mary and Julie. Similarly, the correlating unit 218 may correlate the skillset of Andrew and Lucy with skillset associated with of each John, Mary and Julie. In some other embodiments, the correlating unit 218 may correlate the past skillset of the past service provider entities with current skillset of the current service provider entities based on at least of the service provider parameters, for example, designation, band level, experience or business unit.

In an embodiment, the correlating unit 218 may apply cosine similarity technique to identify the skill gap. The skill gap may refer to absence of skills or a difference in the competency level. Specifically, the correlating unit 218 may generate one or more past skill vector representations corresponding to the past skillset and one or more current skill vector representations corresponding to current skillset. The correlating unit 218 may apply cosine similarity, in a similar manner as explained above in view of meeting information, to identify the skill gap. For instance, in the illustrated environment 100, the identified skill gap may be identified as "Mainframe" and "Python".

After identification of the skill gap, the extracting unit 220 may extract the meeting content from the databases 106 based on the identified skill gap. The database 106 may include, but not limited to, company profile, white papers, technical sheets, audio content, video content, and the like in a form of structured and unstructured data. In some embodiments, the extraction unit 220 may extract the meeting content from one or more external source such as, but not limited to, world wide web. In an exemplary embodiment, the extracting unit 220 may extract the meeting content specific to each current service provider entity based on the skill gap identified corresponding to said current service provider entity. The extracted meeting content is facilitated to the at least one service provider entity for attending the meeting. In some embodiments, the extracted meeting content may be provided at the user device 224 in a form as stored in the database 106. In some other embodiments, the system 202 may process the extracted meeting content before presenting it to the user at the user device 224. For instance, the extracted meeting content may be combined and made presentable before providing the content to the user device 224, e.g., the extracted meeting is extracted and converted into graphic representation for better understanding and then presented to the user at the user device 224. In some embodiments, the extracted meeting content may be customized based on one or more entity specific requirement before presenting the content to the entity. For instance, in case, a current service provider entity has specified preferred language as German, all the meeting content either identified or translated into German and then presented to said entity.

In another example, in case, a current service provider entity has specified preferred representation file type as a presentation file with .ppt extension, the extracted meeting content may be combined or generated in the presentation file. The extracted meeting content may be facilitated to the user at the user device 224 by any suitable means such as, via a uniform resource location (URL), via a software application installed within the user device 224 and so forth. Therefore, in a manner as disclosed in above embodiments, the present disclosure provides an easy, efficient, and convenient technique to identify relevant meeting content which may enhance the chances of the conversion of the meeting into a win or a successful business opportunity. Specifically, the extracted meeting content enhances the skillset of the current service provider entities to enable them to convert the scheduled meeting into successful business opportunity.

In an embodiment, the system 202 may also receive feedback after execution of the scheduled meeting to improve the system 202. Specifically, the system 202 may store the current meeting information 102 along with the past meeting information 104 after executing the scheduled meeting.

Figure 3:
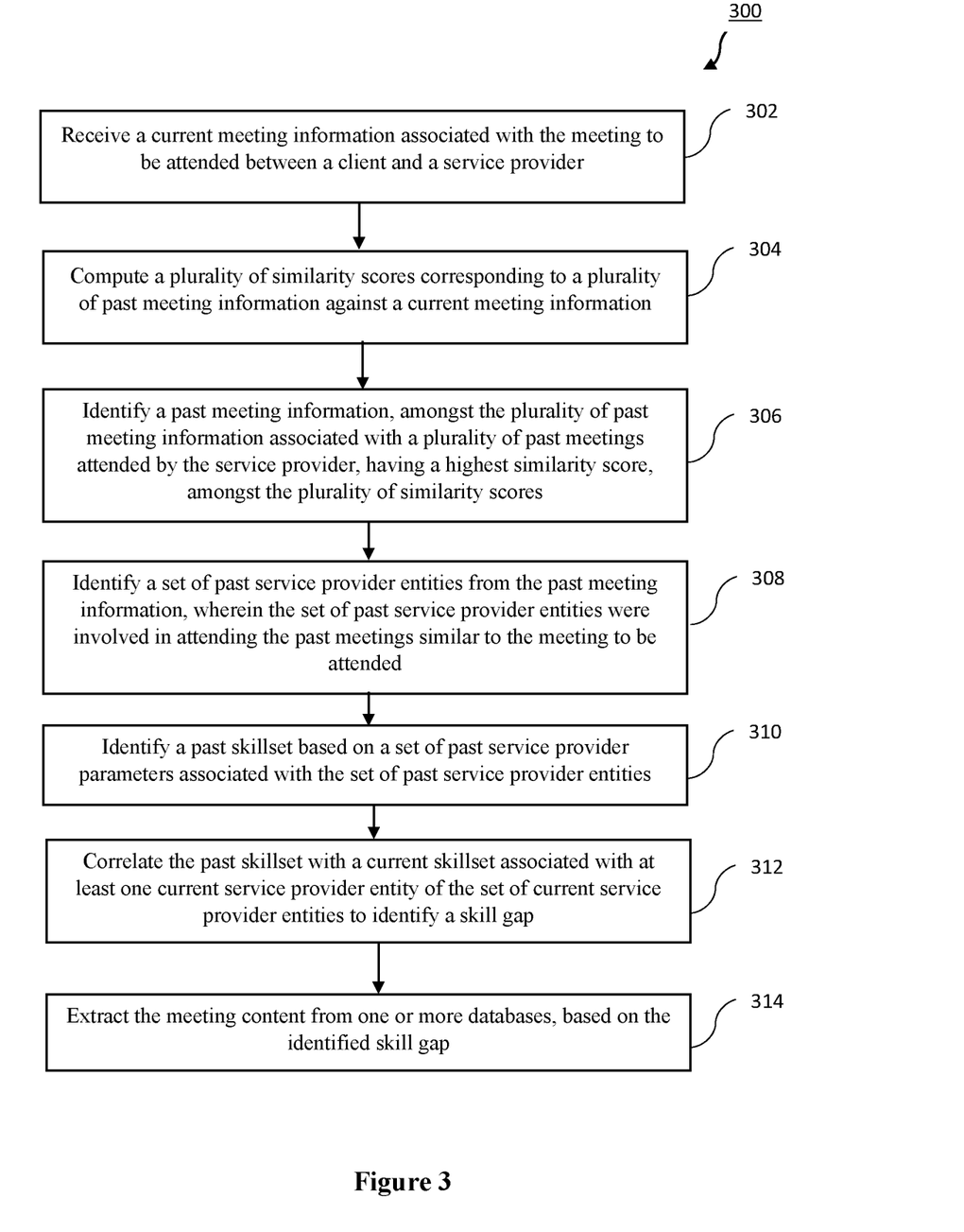
FIG. 3 shows a method 300 for facilitating meeting content to be referred by a service provider for attending a meeting, in accordance with an embodiment of the present disclosure.

FIG. 3 depicts a method 300 of facilitating meeting content to be referred by a service provider for attending a meeting, in accordance with an embodiment of the present disclosure.

As illustrated in FIG. 3, the method 300 includes one or more blocks illustrating a method for facilitating the meeting content. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described.

At block 302, the method 300 may include receiving a current meeting information associated with the meeting to be attended between a client and the service provider. The current meeting information comprises a set of current service provider entities available for attending the meeting.

At block 304, the method 300 may include computing a plurality of similarity scores corresponding to a plurality of past meeting information against the current meeting information. The plurality of past meeting information are associated with a plurality of past meetings attended by the service provider.

At block 306, the method 300 may include identifying a past meeting information, amongst the plurality of past meeting information associated with a plurality of past meetings attended by the service provider, having a highest similarity score, amongst the plurality of similarity scores.

At block 308, the method 300 may include identifying a set of past service provider entities from the past meeting information. The set of past service provider entities were involved in attending the past meetings similar to the meeting to be attended.

At blocks 310, the method 300 may include identifying a past skillset based on a set of past service provider parameters associated with the set of past service provider entities. The past skillset is associated with at least one past service provider entity of the set of past service provider entities.

At blocks 312, the method 300 may include correlating the past skillset with a current skillset associated with at least one current service provider entity of the set of current service provider entities to identify a skill gap, between the past skillset and the current skillset, to be attained by the current service provider entity.

At block 314, the method 300 may include extracting the meeting content from one or more databases, based on the identified skill gap. The meeting content is facilitated to the at least one current service provider entity for attending the meeting.

Computer System

Figure 4:
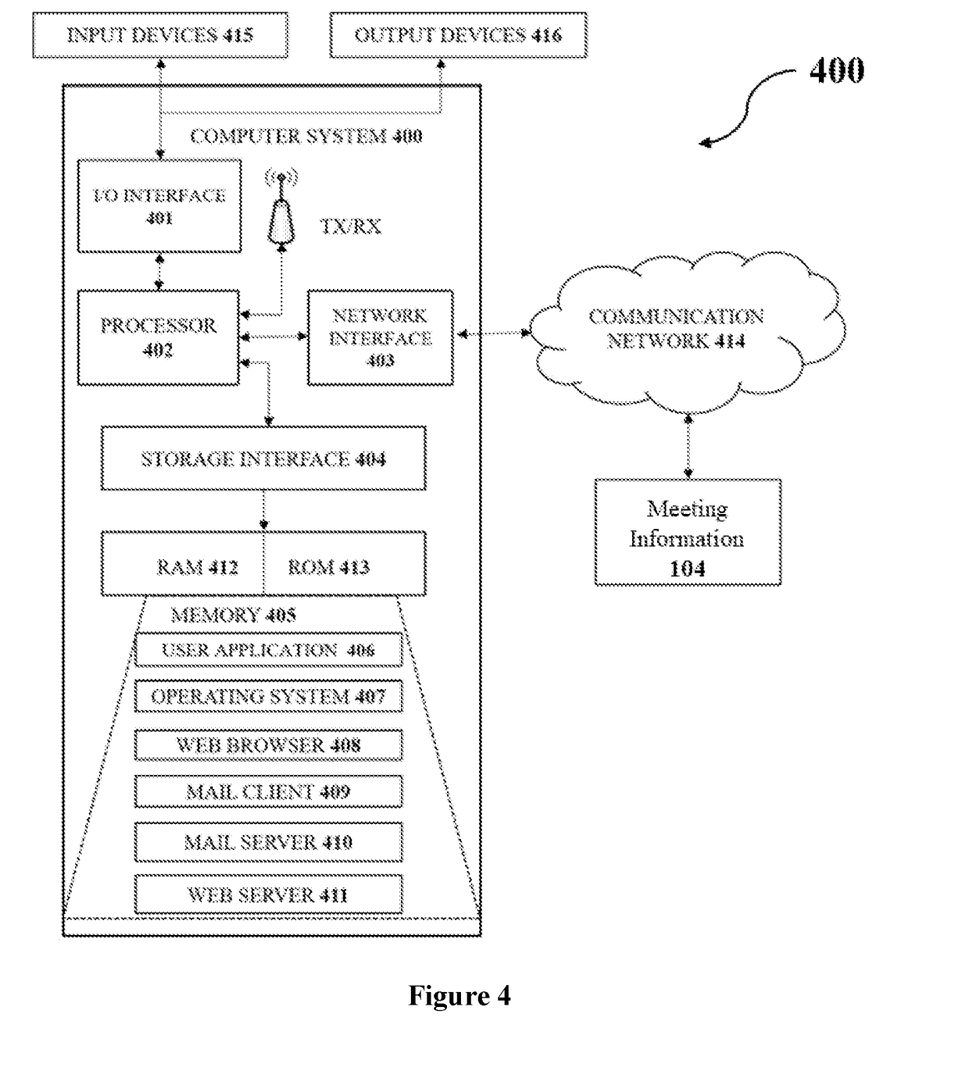
FIG. 4 shows a block diagram of an exemplary computer system 400 for implementing the embodiments consistent with the present disclosure.

FIG. 4 illustrates a block diagram of an exemplary computer system 400 for implementing embodiments consistent with the present disclosure. It may be understood to a person skilled in art that the computer system 400 and its components is similar to the system 202 referred in FIG. 2. In an embodiment, the computer system 400 may be a peripheral device, which is used for facilitating systematic escalation of information related to an event in an organizational hierarchy. The computer system 400 may include a central processing unit ("CPU" or "processor") 402. The processor 402 may comprise at least one data processor for executing program components for executing user or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface, the computer system 400 may communicate with one or more I/O devices.

In some embodiments, the processor 402 may be disposed in communication with a communication network 414 via a network interface 403. The network interface 403 may communicate with the communication network 414. The communication unit may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 414 can be implemented as one of the several types of networks, such as intranet or Local Area Network (LAN) and such within the organization. The communication network 414 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 414 may include a variety of network devices, including routers, bridges, servers, computing devices, storage devices, etc.

In some embodiments, the processor 402 may be disposed in communication with a memory 405 (e.g., RAM 412, ROM 413, etc. as shown in FIG. 4) via a storage interface 404. The storage interface 404 may connect to the memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application, an operating system, a web browser, mail client, mail server, web server and the like. In some embodiments, computer system may store user/application data, such as the data, variables, records, etc. as described in this invention. Such databases may be implemented as fault-tolerant, relational, scalable, secure databases such as OracleR or SybaseR. The operating system may facilitate resource management and operation of the computer system. Examples of operating systems include, without limitation, APPLE MACINTOSHR OS X, UNIXR, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLER ANDROID™, BLACKBERRYR OS, or the like. A user interface may facilitate display, execution, interaction, manipulation, or operation of program components through textual or graphical facilities. For example, user interfaces may provide computer interaction interface elements on a display system operatively connected to the computer system, such as cursors, icons, check boxes, menus, windows, widgets, etc. Graphical User Interfaces (GUIs) may be employed, including, without limitation, APPLE MACINTOSHR operating systems, IBM™ OS/2, MICROSOFT™ WINDOWS™ (XP™, VISTA™/7/8, 10 etc.), UnixR X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERENCE NUMERALS

| Reference Numeral | Description |
| --- | --- |
| 100 | Exemplary environment of a system for identifying at least a pair of entities for a meeting |
| 102 | Current Meeting information |
| 104 | Past Meeting Information |
| 106 | Databases |
| 200 | Block diagram of the system |
| 202 | System |
| 204 | I/O Interface |
| 206 | Processor |
| 208 | Memory |
| 210 | Units |
| 212 | Receiving Unit |
| 214 | Computing Unit |
| 216 | Identification Unit |
| 218 | Correlating Unit |
| 220 | Extraction Unit |
| 222 | Network |
| 224 | User devices |
| 300 | Method for facilitating meeting content to be referred by a service provider for attending a meeting |

We claim:

1. A method of facilitating meeting content to be referred by a service provider for attending a meeting characterized by identifying a skill gap of entities going for the meeting thereby extracting and feeding relevant meeting content to help the entities successfully execute the meeting, the method comprising:

receiving a current meeting information associated with the meeting to be attended between a client and the service provider, wherein the current meeting information comprises a set of current service provider entities available for attending the meeting;

computing a plurality of similarity scores corresponding to a plurality of past meeting information against the current meeting information, wherein the plurality of past meeting information are associated with a plurality of past meetings attended by the service provider, wherein the plurality of similarity scores is computed by applying a cosine similarity using $$\text{Similarity}(A, M) = \frac{A \cdot M}{\|A\| \times \|M\|} = \frac{\sum_{i=1}^{n} A_i \times M_i}{\sqrt{\sum_{i=1}^{n} A_i^2} \times \sqrt{\sum_{i=1}^{n} M_i^2}};$$

identifying a past meeting information, amongst the plurality of past meeting information associated with a plurality of past meetings attended by the service provider, having a highest similarity score, amongst the plurality of similarity scores;

identifying a set of past service provider entities from the past meeting information, wherein the set of past service provider entities were involved in attending the past meetings similar to the meeting to be attended;

identifying a past skillset based on a set of past service provider parameters associated with the set of past service provider entities, wherein the past skillset is associated with at least one past service provider entity of the set of past service provider entities;

correlating the past skillset with a current skillset associated with at least one current service provider entity of the set of current service provider entities to identify a skill gap, between the past skillset and the current skillset, to be attained by the current service provider entity; and extracting the meeting content from one or more databases, based on the identified skill gap, wherein the meeting content is facilitated to the at least one current service provider entity for attending the meeting.

2. The method as claimed in claim 1, wherein the computing of the plurality of similarity scores corresponding to the plurality of past meeting information against the current meeting information is performed by:

generating a plurality of past meeting vector representations corresponding to the plurality of past meeting information stored in a deal database;

generating a current meeting vector representation corresponding to the current meeting information; and applying a cosine similarity technique on each of the plurality of past meeting vector representations relative to the current meeting vector representation to calculate the plurality of similarity scores, for the plurality of past meeting information, indicating a similarity level between each past meeting information and the current meeting information.

3. The method as claimed in claim 1, wherein the correlating of the past skillset with the current skillset associated with the at least one current service provider entity comprises:

generating one or more past skill vector representations corresponding to the past skillset;

generating one or more current skill vector representations corresponding to the current skillset; and applying a cosine similarity technique on each of the one or more past skill vector representations vis-à-vis the one or more current skill vector representations.

4. The method as claimed in claim 1, wherein the current meeting information further comprises at least one of client's name, client's business type, client's requirement, and wherein the client and the service provider includes entities from internal to an organization and external to the organization.

5. The method as claimed in claim 1, wherein the set of past service provider parameters comprises at least one of designation, band-level, skills, experience, business unit and win ratio.

6. A system for facilitating meeting content to be referred by a service provider for attending a meeting characterized by identifying a skill gap of entities going for the meeting thereby extracting and feeding relevant meeting content to help the entities successfully execute the meeting, the system comprising:

a processor; and
a memory, coupled with the processor, storing computer executable instructions which when executed cause the processor to:
receive a current meeting information associated with the meeting to be attended between a client and the service provider, wherein the current meeting information comprises a set of current service provider entities available for attending the meeting;
compute a plurality of similarity scores corresponding to a plurality of past meeting information against the current meeting information, wherein the plurality of past meeting information are associated with a plurality of past meetings attended by the service provider, wherein the plurality of similarity scores is computed by applying a cosine similarity using $$\text{Similarity}(A, M) = \frac{A \cdot M}{\|A\| \times \|M\|} = \frac{\sum_{i=1}^{n} A_i \times M_i}{\sqrt{\sum_{i=1}^{n} A_i^2} \times \sqrt{\sum_{i=1}^{n} M_i^2}};$$

identify a past meeting information, amongst the plurality of past meeting information associated with a plurality of past meetings attended by the service provider, having a highest similarity score, amongst the plurality of similarity scores;
identify a set of past service provider entities from the past meeting information, wherein the set of past service provider entities were involved in attending the past meetings similar to the meeting to be attended; and
identify a past skillset based on a set of past service provider parameters associated with the set of past service provider entities, wherein the past skillset is associated with at least one past service provider entity of the set of past service provider entities;
correlate the past skillset with a current skillset associated with at least one current service provider entity of the set of current service provider entities to identify a skill gap, between the past skillset and the current skillset, to be attained by the current service provider entity; and
extract the meeting content from one or more databases, based on the identified skill gap, wherein the meeting content is facilitated to the at least one current service provider entity for attending the meeting.

7. The system as claimed in claim 6, wherein the processor computes the plurality of similarity scores corresponding to the plurality of past meeting information against the current meeting information by:
generating a plurality of past meeting vector representations corresponding to the plurality of past meeting information stored in a deal database;
generating a current meeting vector representation corresponding to the current meeting information; and
applying a cosine similarity technique on each of the plurality of past meeting vector representations relative to the current meeting vector representation to calculate the plurality of similarity scores, for the plurality of past meeting information, indicating a similarity level between each past meeting information and the current meeting information.

8. The system as claimed in claim 6, wherein the processor correlates the past skillset with the current skillset associated with the at least one current service provider entity by:
generating one or more past skill vector representations corresponding to the past skillset;
generating one or more current skill vector representations corresponding to the current skillset; and
applying a cosine similarity technique on each of the one or more past skill vector representations vis-à-vis the one or more current skill vector representations.

9. The system as claimed in claim 6, wherein the current meeting information further comprises at least one of client's name, client's business type, client's requirement, and wherein the client and the service provider includes entities from internal to an organization and external to the organization.

10. The system as claimed in claim 6, wherein the set of past service provider parameters comprises at least one of designation, band-level, skills, experience, business unit and win ratio.

11. A non-transitory computer-readable storage medium including instructions stored thereon that when processed by a processor cause a system to perform operations comprising:
receiving a current meeting information associated with the meeting to be attended between a client and the service provider, wherein the current meeting information comprises a set of current service provider entities available for attending the meeting;
computing a plurality of similarity scores corresponding to a plurality of past meeting information against the current meeting information, wherein the plurality of past meeting information are associated with a plurality of past meetings attended by the service provider, wherein the plurality of similarity scores is computed by applying a cosine similarity using $$\text{Similarity}(A, M) = \frac{A \cdot M}{\|A\| \times \|M\|} = \frac{\sum_{i=1}^{n} A_i \times M_i}{\sqrt{\sum_{i=1}^{n} A_i^2} \times \sqrt{\sum_{i=1}^{n} M_i^2}};$$

identifying a past meeting information, amongst the plurality of past meeting information associated with a plurality of past meetings attended by the service provider, having a highest similarity score, amongst the plurality of similarity scores;
identifying a set of past service provider entities from the past meeting information, wherein the set of past service provider entities were involved in attending the past meetings similar to the meeting to be attended;

identifying a past skillset based on a set of past service provider parameters associated with the set of past service provider entities, wherein the past skillset is associated with at least one past service provider entity of the set of past service provider entities;

correlating the past skillset with a current skillset associated with at least one current service provider entity of the set of current service provider entities to identify a skill gap, between the past skillset and the current skillset, to be attained by the current service provider entity; and extracting the meeting content from one or more databases, based on the identified skill gap, wherein the meeting content is facilitated to the at least one current service provider entity for attending the meeting.

12. The medium as claimed in claim 11, wherein the computing of the plurality of similarity scores corresponding to the plurality of past meeting information against the current meeting information is performed by:

generating a plurality of past meeting vector representations corresponding to the plurality of past meeting information stored in a deal database;

generating a current meeting vector representation corresponding to the current meeting information; and applying a cosine similarity technique on each of the plurality of past meeting vector representations relative to the current meeting vector representation to calculate the plurality of similarity scores, for the plurality of past meeting information, indicating a similarity level between each past meeting information and the current meeting information.

13. The medium as claimed in claim 11, wherein the correlating of the past skillset with the current skillset associated with the at least one current service provider entity comprises:

generating one or more past skill vector representations corresponding to the past skillset;

generating one or more current skill vector representations corresponding to the current skillset; and applying a cosine similarity technique on each of the one or more past skill vector representations vis-à-vis the one or more current skill vector representations.

14. The medium as claimed in claim 11, wherein the current meeting information further comprises at least one of client's name, client's business type, client's requirement, and wherein the client and the service provider includes entities from internal to an organization and external to the organization.

15. The medium as claimed in claim 11, wherein the set of past service provider parameters comprises at least one of designation, band-level, skills, experience, business unit and win ratio.

\* \* \* \* \*